United States Patent
Berger et al.

(10) Patent No.: US 7,676,854 B2
(45) Date of Patent: Mar. 16, 2010

(54) HELMET, HELMET LINER AND METHOD FOR MANUFACTURING THE SAME

(75) Inventors: Jan Gisle Berger, Oslo (NO); Johan Horsrud, Manstad (NO); Ulf Tolfsen, Gamle Fredrikstad (NO); Roy Kristiansen, Grålum (NO)

(73) Assignee: Crescendo AS, Oslo (NO)

( * ) Notice: Subject to any disclaimer, the term of this patent is extended or adjusted under 35 U.S.C. 154(b) by 1195 days.

(21) Appl. No.: 11/100,627

(22) Filed: Apr. 7, 2005

(65) Prior Publication Data
US 2005/0246824 A1 Nov. 10, 2005

(30) Foreign Application Priority Data
Apr. 7, 2004 (NO) ................................. 20041475

(51) Int. Cl.
*A42B 1/06* (2006.01)
(52) U.S. Cl. .......................................... 2/410; 264/318
(58) Field of Classification Search ...................... 2/410; 264/318, 320, 322, 554
See application file for complete search history.

(56) References Cited

U.S. PATENT DOCUMENTS

| | | | |
|---|---|---|---|
| 3,378,888 A | 4/1968 | Robertson | |
| 3,425,061 A | 2/1969 | Webb | |
| 3,673,609 A | 7/1972 | De Simone | |
| 3,877,076 A | 4/1975 | Summers et al. | |
| 4,023,213 A * | 5/1977 | Rovani | 2/413 |
| 4,290,149 A * | 9/1981 | Aileo | 2/414 |
| 4,432,099 A * | 2/1984 | Grick et al. | 2/412 |
| 4,586,200 A * | 5/1986 | Poon | 2/413 |
| 4,724,549 A | 2/1988 | Herder et al. | |
| 5,035,009 A * | 7/1991 | Wingo et al. | 2/414 |
| 5,361,419 A * | 11/1994 | Bernstein | 2/423 |
| 5,366,685 A * | 11/1994 | Fujii et al. | 264/547 |
| 5,829,065 A * | 11/1998 | Cahill | 2/418 |
| 5,896,680 A | 4/1999 | Kim et al. | |
| 5,950,244 A * | 9/1999 | Fournier et al. | 2/414 |
| 6,007,898 A | 12/1999 | Kim et al. | |
| 6,536,052 B2 | 3/2003 | Tao et al. | |
| 6,749,794 B2 * | 6/2004 | Spengler | 264/458 |
| 7,413,698 B2 * | 8/2008 | Bearse et al. | 264/511 |

(Continued)

FOREIGN PATENT DOCUMENTS

DE 2504849 B2 11/1975

(Continued)

*Primary Examiner*—Shaun R Hurley
*Assistant Examiner*—Andrew W Sutton
(74) *Attorney, Agent, or Firm*—Rothwell, Figg, Ernst & Manbeck, P.C.

(57) ABSTRACT

This invention relates to a helmet, comprising an external shell (9) and an impact-absorbing helmet liner (10) in which the helmet liner comprises a layer provided with protruding, deformable and impact-absorbing hollow knobs (7) distributed on an substantial part of the surface of the helmet liner as a protective layer.

The helmet is characterized in that the hollow knots (7) are arranged for deformation by crushing in case of external impact on the helmet, and that the helmet liner (10) with the hollow knots (7) exhibits undercut.

The helmet may also comprise an impact-absorbing and preferably resilient layer (2) which may be arranged between the external shell (9) and an internal lining (11) being arranged to rest in contact with the head of a user.

14 Claims, 13 Drawing Sheets

U.S. PATENT DOCUMENTS

| | | |
|---|---|---|
| 2002/0066135 A1 | 6/2002 | Tao et al. |
| 2002/0120978 A1* | 9/2002 | Moore, III .................... 2/412 |
| 2003/0005511 A1 | 1/2003 | Tao et al. |
| 2003/0197302 A1* | 10/2003 | Kakarala et al. ............ 264/175 |
| 2003/0219554 A1* | 11/2003 | Wang ........................ 428/34.1 |
| 2005/0040569 A1* | 2/2005 | Fitzell ........................ 264/554 |
| 2007/0209098 A1* | 9/2007 | Peart ............................. 2/410 |

FOREIGN PATENT DOCUMENTS

| | | |
|---|---|---|
| DE | 7810225 U | 4/1978 |
| DE | 3035265 A1 | 4/1982 |
| DE | 4129339 A1 | 3/1993 |
| EP | 0090720 A1 | 10/1983 |
| EP | 1219188 A2 | 7/2002 |
| ES | 000204219-0001 | 10/2004 |
| JP | 59185621 A | 10/1984 |
| JP | 5287603 | 11/1993 |
| JP | 09052282 A | 2/1997 |
| NO | 78582 | 3/2005 |
| WO | WO 93/08711 A1 | 5/1993 |
| WO | WO 97/45032 A1 | 12/1997 |
| WO | WO 99/02054 A1 | 1/1999 |

* cited by examiner

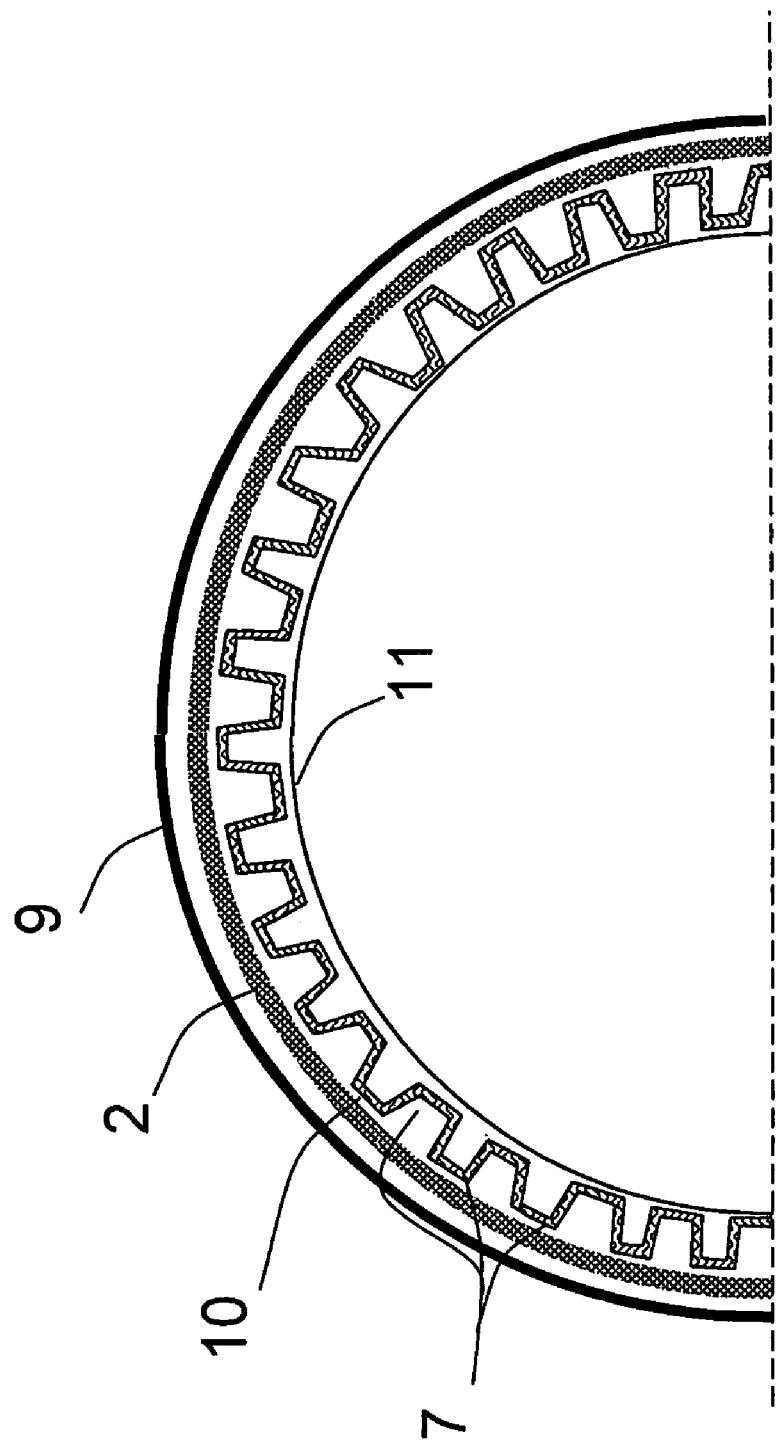

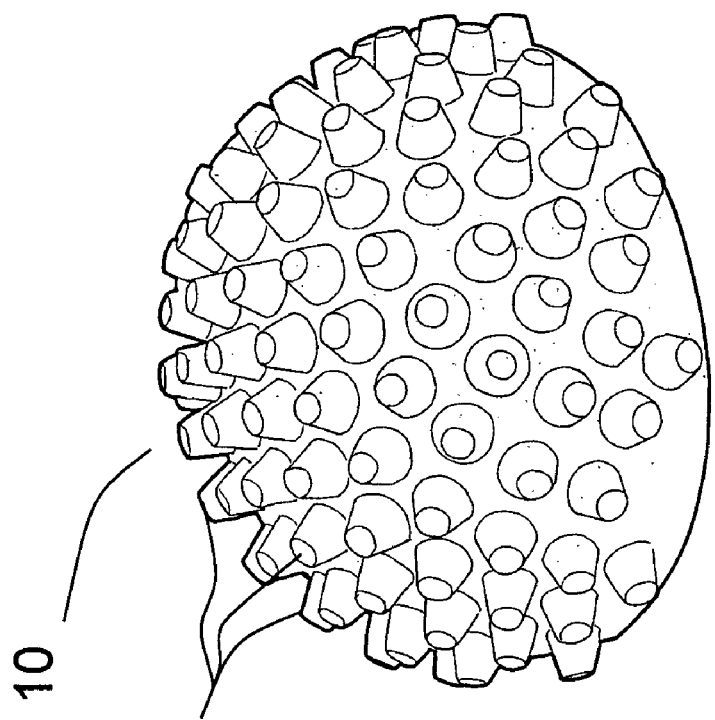
7
10
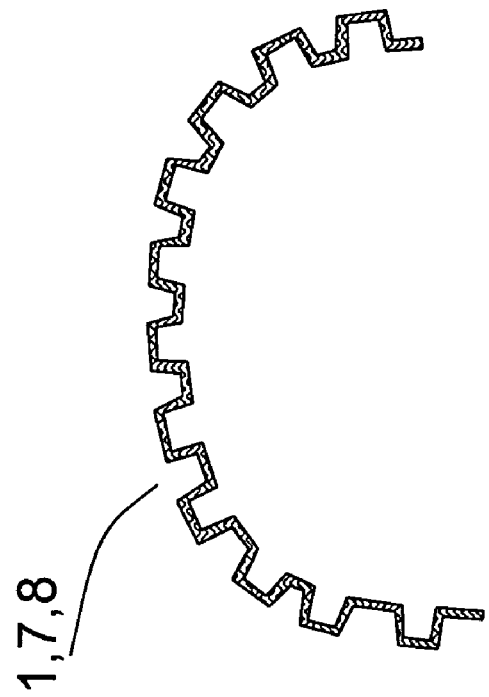
1,7,8
Fig. 9

HELMET, HELMET LINER AND METHOD FOR MANUFACTURING THE SAME

INTRODUCTION

This invention relates to a helmet liner with undercut, and to a method for manufacturing a helmet liner with undercut. The invention also relates to a helmet, including an external shell and an impact-absorbing helmet liner, in which the helmet liner comprises a layer provided with protruding, deformable and impact-absorbing hollow knobs distributed on an essential part of the surface of the helmet liner as a protective layer, in which the hollow knobs are arranged for deformation by crushing in case of external impact on the helmet, the helmet liner with the hollow knobs exhibiting undercut. Further, the invention comprises a first mould for manufacture of a helmet liner with undercut, in which the first mould includes a main mould and a flexible slip mould having secondary, protruding forms.

The invention further relates to a second mould for the flexible slip mould with secondary, protruding forms, with a corresponding method for manufacture of the second mould for production of a helmet liner with undercut.

Finally, the invention includes a method for manufacturing the flexible slip mould with secondary, protruding forms by means of the second mould, for use in production of a helmet liner with undercut.

BACKGROUND OF THE INVENTION

There is always a need for protective helmets which may reduce possible personal injuries in case of accidents. For this purpose, several types of helmets have been developed, among which are helmets with helmet liners. However, there is also a need for a helmet which provides as good protection as possible. By making helmet liners with knobs being deformable, a reduction of the forces reaching the head of a user in case of impact, e.g., in connection with accidents. There exists a need a helmet with a helmet liner which provides as good a protection as possible.

For this purpose, helmets having helmet liners both with cuttings and energy-absorbing knobs have been developed. These helmet liners have previously not been optimized with a view to the distribution, orientation, location and form of the knobs. For this reason, there is also a need for a helmet liner which may help mending this problem.

For production of such helmet liners, several types of manufacturing processes have been attempted, e.g., injection moulding in a mould and vacuum moulding on a hemispherical rigid dome having protrusions distributed on the dome. The tools which are utilized for injection moulding are as a rule more expensive that the tools which are utilized for vacuum moulding. A problem with vacuum moulding on a rigid dome-shaped mould is that it is the moulding process which becomes vital for distribution, orientation and arrangement of the knobs. A helmet liner being moulded with undercut may be damaged when it is removed from the mould, at any rate, the percentage of rejects would be high. Pressforming of the material in on a flat mould have also been attempted, so that the moulded material receives the shape of half an unfolded globe to be folded and fastened to the desired shape. This process is a time-consuming, complicated and expensive process which does not necessarily provides a helmet liner of sufficient quality. In order to be able to manufacture a helmet liner having the desired orientation, arrangement and distribution of the knobs for an optimal protection of the head of the user, there is a need for a more reasonable process for manufacturing helmet liners with desired properties. The present invention solves these challenges.

BACKGROUND ART

U.S. Pat. No. 3,378,888 (Robertson) relates to a structure for vacuum moulding of thermoplastic material on flexible moulds with undercut, more precisely toy cars.

JP 9052282 A2 (Takahiko et al.) describes a thermoplastic plate being formed on a mould for vacuum moulding. The mould comprises a gas permeable and deformable outer mould part of silicone rubber and a gas permeable core part of metal which fits in the outer mould part. A thermoplastic plate may be vacuum moulded on the outer mould part and the core part.

EP 0090720 A1 (Sacrest et al.) relates to a bicycle or motorcycle helmet with an upper part which is thermoformed of a synthetic material and comprises elevations such as pockets or ribs. Those ends of the pockets or ribs which are at the opposite end relative to the ends which is integrated in the upper part, are arranged to rest on the head of the user. The pockets constitute shock absorbers and form ducts for circulation of air for cooling the head.

A disadvantage with the helmet according to EP 0090720 A1 (Sacrest et al.) is that there is a risk for the introverted elevations may be pressed against, or even penetrate the head in case of a blow or impact to the helmet because the elevations have a much smaller area than the shell, with corresponding danger of personal injuries.

U.S. Pat. No. 3,425,061 (Webb) describes an energy-absorbing helmet which is constituted by two rigid layers. The inside layer is provided with several undivided introvert ribs which may have various forms. Between the two rigid layers a suitable energy-absorbing material, e.g., rigid polyurethane foam, may be arranged. The helmet is made to be resistant to deformation or crushing.

The helmet according to U.S. Pat. No. 3,425,061 has some of the same disadvantages as the helmet according to EP 0090720 A1 (Sacrest et al.). On impact the rigid ribs may be pressed against the head, thus causing personal injuries.

WO 97/45032 (Zahn) describes a military helmet having an outer, stable helmet calotte and a support basket which consists of several bands being connected to each other. The bands have plastic deformable knobs which are directed towards the helmet shell and which are embedded in the bands. The support basket is attached to the outer shell by means of bolts or rivets and a fork arrangement, and so that it is prestressed to the outer shell by means of the knobs. The prestress of the helmet calotte may be varied by adjusting the bolts/rivets and the fork arrangement.

WO 93/08711 (Halstead et al.) describes an example of a helmet moulded to a head shape by undercut and with external, introvert undercut. It is the head shape enclosing the head for the helmet which is manufactured by means of undercut, in addition to the external, introvert, indentations. The helmet is made of a resilient polymer by injection moulding. The direction of the undercuts may not be chosen freely by the manufacturing method according to WO 93/08711. A condition for avoiding wreckage of the external indentations or undercuts when tilting the helmet out of the mould, is that the helmet have to be tilted about an axis of rotation out of the bottom mould. This involves that the known helmet moulded with undercut cannot have an optimal protective shape and orientation of the knobs moulded with undercut, in fact, the shape of the knobs is limited to an orientation which is dictated by that which is possible to tilt out of the mould in the known art.

A further problem with injection moulding of helmet liners is that it may be difficult to obtain satisfactory quality of the injection moulded product.

U.S. Pat. No. 4,432,099 (Grick et al.) describes a helmet having a rigid external shell, an energy-absorbing layer of polystyrene foam and an internal helmet liner. The helmet liner comprises four layers of elastic thermoplastic, in which each layer is provided with a number of hollow, hemispherical projections. Inside the innermost thermoplastic layer, it is glued a layer made of comfort foam and which has a regular hemispherical pattern, almost similar to bubble plastic. Innermost to the head a fabric layer is arranged. Each of the four layers of thermoplastic is vacuum moulded over a hemispherical form having bulges or protrusions being arranged in a regularly spaced apart arrangement. Each vacuum moulded layer includes a flat portion having hollow spherical protrusions arranged in a spaced apart arrangement with a regular distance from each other. External layers of the helmet liner may be formed with a hemispherical mould having a larger diameter than the hemispherical shape which is used for manufacturing the inner layers of the helmet liner. Thereafter, the four layers are attached to each other so that they constitute the inner liner. Thus, the inner liner is manufactured in two steps, and it is not explained how the vacuum moulding takes place. By using a single mould it would be difficult to manufacture a helmet liner having undercut without a risk for damaging the final moulded liner.

The present invention avoids the disadvantages associated with the inventions described above. The helmet liner according to the invention has undercut, and with the present invention it is possible to reduce or eliminate any risk for damaging the helmet liner when being removed from the mould after moulding. It is provided with hollow knobs which are arranged for permanent deformation or crushing by external impact, and it is further impact-absorbing, so that the forces from an impact on a helmet with a helmet liner according to the invention are reduced to as large an extent as possible. By means of the method according to the invention it is possible to manufacture a helmet liner having a satisfactory quality in one batch, in which a desired shape and orientation of impact-absorbing knobs are not limited by the fact that the helmet liner with undercut for the knobs could not be lifted, revolved or rotated out of the mould according to the background art. Thus, formation of the impact-absorbing knobs having an orientation and a distribution on the head shape is achieved, in such a manner that the desired protection is obtained without regard to the limitations of the background moulding techniques.

SHORT SUMMARY OF THE INVENTION

This invention solves several of the problems with the background art for manufacturing an impact-absorbing helmet liner having a desired shape and orientation of a plurality of protruding protective portions which exhibits undercut, and relates to a method for manufacturing a helmet liner with undercut, characterized in that the method comprises the following steps:

preparing a first mould which comprises a flexible slip mould with secondary, relatively rigid and protruding forms arranged on an essentially rigid main mould;

arranging a softenable and/or flexible, tight film or foil on the first mould for forming the flexible, tight foil;

forming the flexible, tight foil on the first mould to a shaped product with a quantity of protrusions and cavities, in which the shaped product exhibits under-cut;

consolidating the shaped product with a quantity of protrusions and cavities on the first mould to a shaped starting product with undercut;

removing the shaped starting product and the flexible slip mould with the secondary forms from the main mould;

removing the flexible slip mould with the secondary forms from the shaped starting product.

Further advantages of the method according the invention for manufacturing a helmet liner which exhibits undercut, appears from the corresponding dependent claims.

This invention also relates to a helmet liner with undercut which may be made according to the following process:

preparing a first mould which comprises a flexible slip mould with secondary, relatively rigid and protruding forms on an essentially rigid main mould;

arranging a softenable and/or flexible, tight film or foil on the first mould for forming;

forming the flexible, tight foil on the first mould to a shaped product with a quantity of protrusions and cavities, in which the shaped product exhibits under-cut;

consolidating the shaped product with a quantity of protrusions and cavities on the first mould to a shaped starting product which exhibits undercut;

removing the shaped starting product and the flexible slip mould with the secondary forms from the main mould; and removing the flexible slip mould with the secondary forms from the shaped starting product.

Additional advantages with a helmet liner manufactured by the process according to the invention is indicated in the corresponding dependent claims.

The invention also comprises a helmet, including an external shell and an impact-absorbing helmet liner in which the helmet liner comprises a layer provided with protruding, deformable and impact-absorbing hollow knobs distributed on an essential part of the surface of the helmet liner as a protective layer, in which the hollow knobs are arranged for deformation by crushing in case of external impact on the helmet, and in which the helmet liner with the hollow knobs exhibit undercut. Novel and distinct features of the helmet according to the invention are that the helmet liner including the hollow knobs are made of a softenable and/or flexible, tight film or foil by moulding on a first mould including a flexible slip mould having secondary, relatively rigid and protruding forms, and an essentially rigid main mould, into a shaped product having a quantity of knobs or protrusions and cavities consolidated on the first mould to a shaped starting product.

Further advantages and features of a helmet according to the invention appears from the corresponding dependent claims.

A first mould is further provided, which may be utilized for manufacturing a helmet liner with undercut. This first mould comprises a flexible slip mould with secondary, relatively rigid and protruding shapes arranged on a main mould.

Other advantages and features of the first mould according to the invention appears from the corresponding dependent claims.

A second mould for a flexible slip mould with secondary, protruding forms, in which the flexible slip mould shall be utilized for production of a helmet liner with undercut, may, e.g., be made according to a method which comprises the following steps:

manufacturing a first initial mould substantially corresponding to the shape of the upper part of the head of a person by making a cast of the upper part of the head of a person, or of the inside of a helmet or an object having a helmet shape;

attaching knobs in the desired quantity and distribution on the entire or on parts of the first initial mould so that a template is formed for the second mould;

arranging the template in a container;

filling a curable mould material over the template in the container;

consolidating the mould material in the container with the template, for formation of the second mould with one or more recesses or cavities which corresponds to the external surface of the knobs, and in which the second mould with the recesses is arranged for manufacture of the flexible slip mould with secondary, protruding shapes;

removal of the second mould from the container; and removal of the template from the finished, second mould.

Further advantages of the method for manufacturing a second mould for a flexible slip mould with secondary, protruding forms, for use in production of a helmet liner with undercut, appear from the accompanying dependent claims.

The second mould for a flexible slip mould with secondary, protruding forms, for production of a helmet liner with undercut, may, e.g., include the following features:

that the second mould comprises one or more recesses or cavities which are arranged for receiving moulding mass, and one or more centering pegs distributed in the second mould with the recesses and arranged for centering a second, complementary initial mould in the second mould with the recesses;

that the second initial mould has a diameter which is less than the diameter of the second mould and which is designed for being arranged in the second mould so that a spacing is formed between the second mould with the recesses and the second initial mould which is arranged for receiving moulding mass;

so that by consolidation of moulding mass in the spacing, a flexible slip mould with secondary, protruding forms is formed, for arrangement on a fixed main mould with a shape complementary to the second initial mould.

The flexible slip mould included in the first mould and which has secondary, protruding forms, for production of a helmet liner which exhibits undercut, may for example be manufactured according to a method which comprises the following steps:

filling moulding mass in a second mould which comprises one or more recesses or cavities and one or more centering pegs which are distributed in the second mould with the recesses and arranged for centering a second, complementary initial mould in the second mould with the recesses;

arranging a second initial mould in the second mould with the moulding mass, so that a spacing is formed towards the second mould;

consolidating the moulding mass to form the flexible slip mould with secondary, protruding forms;

removing the second initial mould from the consolidated slip mould in the second mould with the consolidated, flexible slip mould;

drawing out the flexible slip mould from the second mould.

BRIEF DESCRIPTION OF THE DRAWINGS

The invention is illustrated in the accompanying drawings which are meant for illustration of the invention only, and which should not be considered to limitate the scope of the invention.

FIG. 1 is a schematic and simplified vertical section through the upper portion of a helmet with corresponding helmet liner according to the invention.

FIG. 2a-2b is perspective views of a helmet liner according to the invention, in which FIG. 2a shows the helmet liner as a perspective view as seen from above, and FIG. 2b shows the helmet liner as a perspective view as seen from below.

FIG. 3a shows a knob having a circular base plan, the shape of which changes according to the height of the knob and in which the top ends up having a quadrangular circumference. FIG. 3b shows a knob having a shape as a cut or contracted cone, and FIG. 3c shows a knob with a shape as a cut or contracted pyramid.

FIG. 4a-4c illustrates some possible embodiments of a single knob in a perspective view, similar to FIG. 3a-3c, in which FIG. 4a-4c shows some possible embodiments of the knobs with a straight or angular cut shape. FIG. 4a shows a knob having a straight cut shape, FIG. 4b shows knob having an angular cut shape and FIG. 4c shows a knob with both straight and straight cut shape.

FIG. 5-9 shows an example on how shaping for a helmet liner may take place.

FIG. 5 is a schematic and simplified vertical section through a thermoplastic plate which is formed over a first mould, preferably divided in two parts, which comprises a flexible slip mould with secondary, protruding forms and an essentially rigid main mould.

FIG. 6 is a vertical section similar to FIG. 5 which shows the thermoplastic plate formed on the mould to a starting product.

FIG. 7 is a vertical section similar to FIGS. 5 and 6 and shows that the starting product on the flexible slip mould is removed from the main mould.

FIG. 8 is a vertical section similar to FIGS. 5-7 and shows that the starting product is removed from the flexible slip mould, or vice versa, that the flexible slip mould is removed from the starting product.

FIG. 9 is a vertical section similar to FIGS. 5-8 and shows that the starting product may possibly be given a secondary treatment, e.g., be polished or other treatment according to desire, into a finished product.

Figures 2A, 2B:
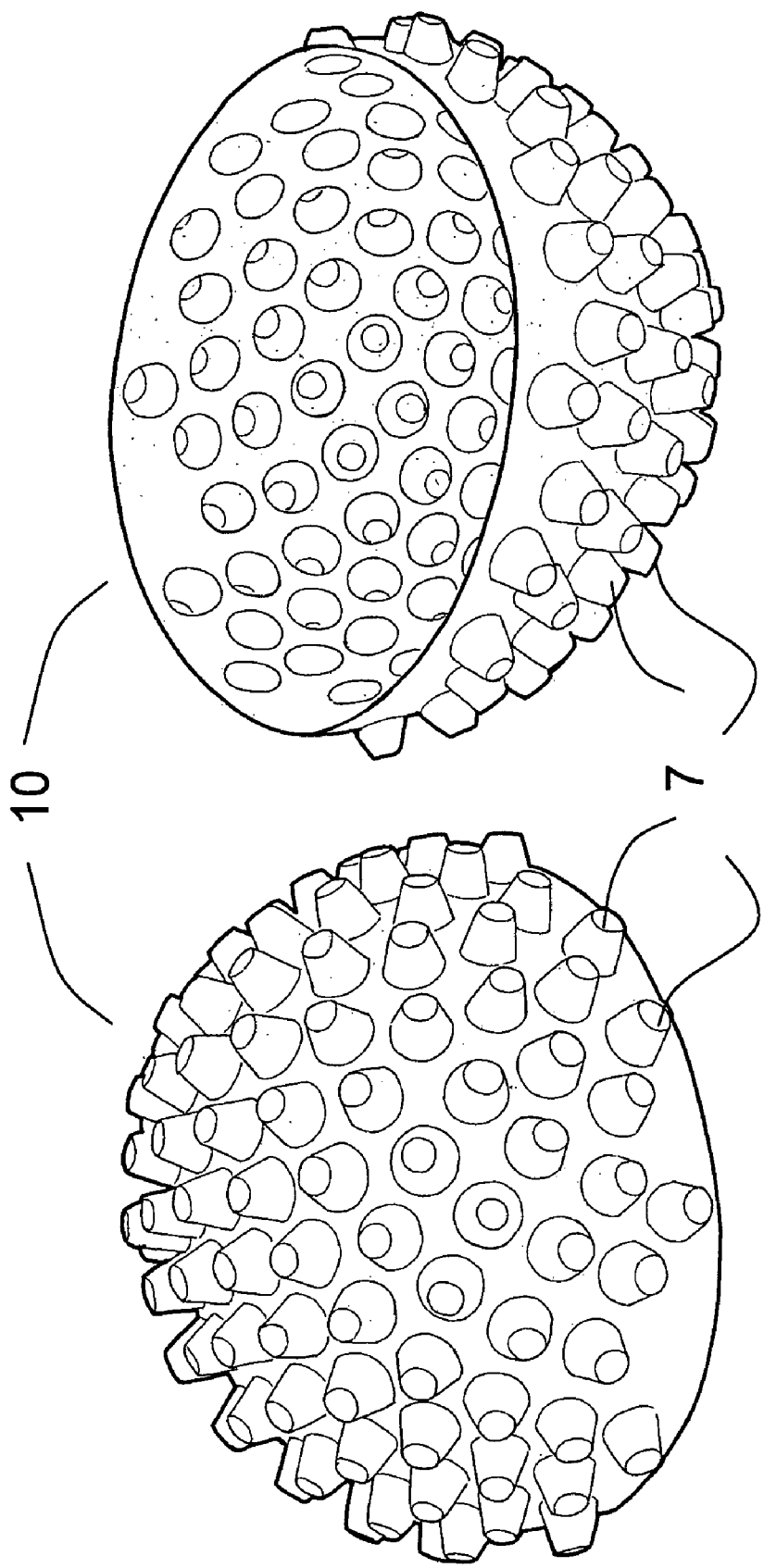

A more detailed description of a method for manufacturing a helmet liner according to the invention and a helmet with such a helmet liner will be given below, with reference to the accompanying drawings. Likewise, a more detailed description will follow of a first mould for a helmet liner according to the invention, a second mould for manufacturing a flexible slip mould to be included in the first mould for the helmet liner according to the invention, and a method for manufacturing the flexible slip mould by means of the second mould. Finally, a description of a method for manufacturing the second mould follows.

DESCRIPTION OF PREFERRED EMBODIMENTS OF THE INVENTION

Reference is now made to FIGS. 5-9, which illustrates schematically and simplified an example on how a helmet liner with undercut may be manufactured.

A method for manufacturing a helmet liner 10 with undercut, may comprise the following steps:

Preparing a first mould 3,4,5 which comprises a flexible slip mould 4 with secondary, relatively rigid and protruding forms 5 arranged on an essentially rigid main mould 3. The main mould 3 is clothed with the flexible slip mould 4,5 and required equipment is connected, depending on the type of forming process to be utilized.

Arranging a softenable and/or flexible, tight film or foil 1 on the first mould 3,4,5 for forming the flexible, tight foil 1. Please see FIG. 5.

Forming the flexible, tight foil 1 on the first mould 3,4,5 to a shaped product 1 with a quantity of protrusions 7 and cavities 8, in which the shaped product 1 exhibits undercut. Please see FIGS. 5 and 6.

Consolidating the shaped product 1 with an quantity of protrusions 7 and cavities 8 on the first mould 3,4,5 to a shaped starting product 1,7,8 with under-cut. Please see FIG. 6.

Removing the shaped starting product 1,7,8 and the flexible slip mould 4 with the secondary forms 5 from the main mould 3. Please see FIG. 7.

Removing the flexible slip mould 4 with the secondary forms 5 from the shaped starting product 1,7,8. Please see FIG. 8.

The flexible, tight foil or film 1 is not limited to films or foils only, but may also be a thicker plate or sheet. The material may be plastics, metal or a combination of plastic and metal, e.g., thermoplastics, aluminum, steel or a combination of thermoplastics and aluminum.

Forming of the foil 1 may in one possible embodiment be made by exposure to underpressure on the inside surface of the foil 1 facing the first mould 3,4,5, e.g., by exposing the foil 1 to underpressure by vacuum pumping so that it is drawn towards the first mould 3,4,5. This is a very simplified example on a forming process by vacuum moulding, but the step of forming the flexible, air-tight foil 1 is not limited to such a simplified variant of vacuum moulding, as there are many variants of vacuum moulding. The step of forming the flexible, tight foil 1 to a formed product 1 with an quantity of protrusions and cavities 8, may in one embodiment of the invention comprise vacuum moulding of the flexible, tight foil 1 on the first mould 3,4,5 through vacuum ducts 6 at least arranged through the slip mould 4.

The foil 1 may in another possible embodiment be formed by exposing it to a pressure on the external surface of the foil 1 facing away from the first mould 3,4,5, e.g. by exposing the foil 1 to a forming pressure so as to be pressed against the first mould 3,4,5. This is a very simplified example on a forming process by press forming, but the step of forming the flexible tight foil is not limited to such a simplified variant of press forming, as many variants of press forming exist. Thus, the step of forming the flexible, tight foil 1 to a shaped product 1 with a quantity of protrusions 7 and cavities 8 may comprise press forming of the flexible, tight foil 1 on the mould 3,4,5.

In principle, the shaped starting product may itself be of such a sufficiently good quality that further machining or working is not required, but it is also possible to manufacture the final shape 10 of the helmet liner from the shaped starting product 1,7,8. This is in principle illustrated in FIG. 9. Such manufacture may, e.g., be cutting, polishing, adaptions and adjustments of the shape of the helmet liner or other desired or required working.

Before the step of forming the flexible, tight foil 1, the method may further comprise the step of softening the flexible, tight foil 1. The step of softening the flexible, tight foil 1 may advantageously take place by heating, but it is also possible, e.g., to apply chemical softening substances on the flexible, tight foil 1.

The step of consolidating the shaped starting product 1,7,8 on the first mould 3,4,5 may take place by cooling and setting after the step of forming the flexible tight foil 1. Alternatively, the step of consolidating the shaped starting product 1,7,8 may take place by hardening. The choice of consolidation process depends among other things on the forming process to be utilized and the material to be used for the manufacturing process.

When the starting product 1,7,8 is consolidated on the first mould 3,4,5, it may be removed from the flexible slip mould 4,5, or vice versa, that the flexible slip mould 4,5 may be removed from the starting product 1,7,8. Moreover, the main mould 3 may be removed from the main mould 3 before the starting product 1,7,8 is removed from the flexible slip mould 4,5 or after the starting product is removed from the flexible slip mould 4,5. Alternatively, the main mould 3 may be removed simultaneously with the flexible slip mould 4 with the secondary forms 5 from the shaped starting product 1,7,8.

The main mould 3 may in one embodiment of the invention be maintained in a spanned and rigid state by the main mould 3 itself being rigid, in the form of a rigid shell or a massive mould. In a further embodiment of the invention, the main mould 3 may be maintained in a spanned and rigid state by supply of pressure, preferably fluid pressure inside the main mould 3.

Before the step of forming the flexible, tight foil 1, the flexible, tight foil 1 may be spanned across the first mould 3,4,5 by supply of fluid, preferably a gas such as air.

Reference is now made to FIGS. 2a and 2b in which a helmet liner according to the invention is shown as a perspective view as seen from above and as a perspective view as seen from below in the opposite direction, respectively. FIG. 5-9 illustrates a possible manufacturing process for the helmet liner 10.

A possible embodiment of the helmet liner according to the invention is illustrated in FIGS. 2a-2b. The helmet liner exhibits undercut and may be manufactured by the following process:

preparing a first mould 3,4,5 which comprises a flexible slip mould 4 with secondary, relatively rigid and protruding forms 5 on an essentially rigid main mould 3;

arranging a softenable and/or flexible, tight film or foil 1 on the first mould 3,4,5 for forming;

forming the flexible, tight foil 1 on the first mould 3,4,5 to a shaped product 1 with a quantity of protrusions 7 and cavities 8;

consolidating the shaped product 1 with a quantity of protrusions 7 and cavities 8 on the first mould 3,4,5 to a shaped starting product 1,7,8 which exhibits undercut;

removing the shaped starting product 1,7,8 and the flexible slip mould 4 with the secondary forms 5 from the main mould 3;

removing the flexible slip mould 4 with the secondary forms 5 from the shaped starting product 1,7,8.

The forming of the flexible, tight foil 1 to a desired shape may in a preferred embodiment take place by vacuum moulding of the flexible, tight foil 1 on the first mould 3,4,5 through vacuum ducts 6 which at least are arranged through the slip mould 4. The forming of the flexible, tight foil 1 may also take place by press forming of the flexible, tight foil 1 on the mould 3,4,5.

In principle, the shaped starting product 1,7,8 may itself be of such sufficiently good quality that further treatment or working is not required. The shaped starting product may for this reason itself constitute the final shape of the helmet liner 10.

It is also possible to work the helmet liner 10 into its final shape from the shaped starting product 1,7,8. This is in principle illustrated on FIG. 9. Such working may include, e.g., cutting, polishing, adaptations and adjustments of the shape of the helmet liner. The final shape of the helmet liner 10 may thus be manufactured from the shaped starting product 1,7,8.

Reference is now made to FIG. 1, in which a very simplified and schematic vertical section through a helmet which includes a helmet liner according to the invention. Such a helmet comprises an outer shell 9 and an impact-absorbing helmet liner 10, in which the helmet liner comprises a layer provided with protruding, deformable and impact-absorbing hollow knobs distributed over an essential portion of the surface of the helmet liner as a protective layer. The shape and the orientation of the knobs are decided by the direction in which it is assumed that the knobs can have a protective effect, and not limited by the manufacturing methods of the background art. The hollow knobs 7 are arranged for deformation by crushing in case of external impact on the helmet, and that the helmet liner 10 with the hollow knobs 7 exhibits undercut.

Novel and inventive features of the invention are that the helmet liner including the hollow knobs 7 are made of a softenable and/or flexible, tight film or foil 1 by moulding on a first mould 3,4,5 including a flexible slip mould 4, having secondary, relatively rigid and protruding forms 5, and an essentially rigid main mould 3, to form a shaped product 1 having a quantity of knobs or protrusions 7 and cavities 8, the shaped product being consolidated on the first mould 3,4,5 to a shaped starting product 1,7,8. The moulding of the helmet liner may be made on the first mould 3,4,5, e.g., by means of vacuum moulding or press forming.

An impact-absorbing and preferably resilient layer 2 may advantageously be arranged between the external shell 9 and the helmet liner 10. The helmet with the helmet liner 10 may itself have a good fit, however, for additional comfort the helmet may further comprise an internal liner 11 arranged for resting on the head of a user. Several types of materials may be utilized for such a liner, such as fabrics of natural fibres, polymer textiles or other desirable materials.

The knobs on the helmet liner 10 are more closely illustrated on FIGS. 3a-3c and 4a-4c, and are advantageously distributed evenly or regularly on the entire helmet liner 10, e.g., by an arrangement of the knobs 7 spaced apart in a generally similar distance. The knobs 7 may also be arranged in an irregular or uneven pattern on the surface of the helmet liner 10 for such cases in which an equal deformation resistance is not desired for all incoming directions of impacts on the helmet.

In a preferred embodiment, more knobs 7 per area unit are arranged in the part of the helmet liner 10 which is arranged for protection of the brow 12, the top of the head 13 and the back head 14 of the user than there is arranged knobs 7 per area unit in the portion of the helmet liner 10 which is arranged for protection of the sides 15 of the head.

In a further preferred embodiment the knobs 7 have generally the same height. Alternatively, the height of the knobs 7 may vary.

Figure 3C:
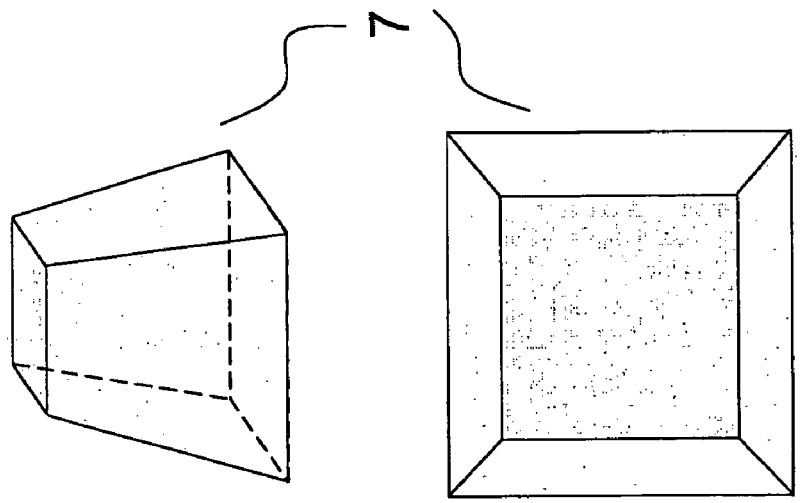
FIG. 3a-3c illustrates some possible embodiments of a single knob as a perspective view and a top view.
Figure 3B:
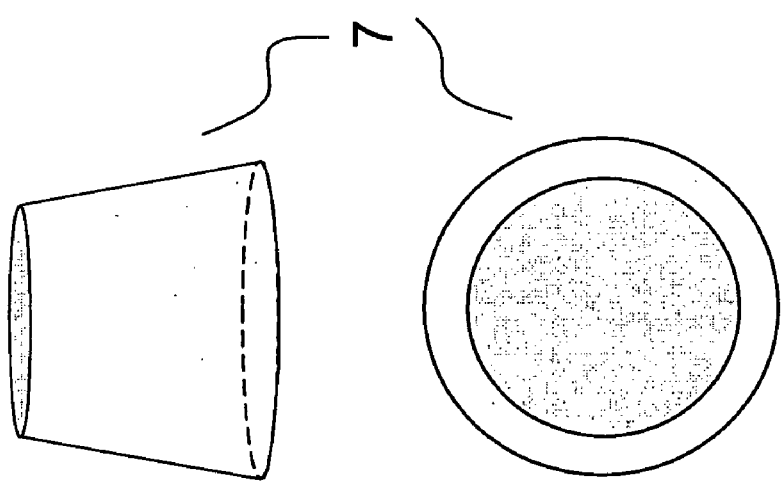
Figure 3A:
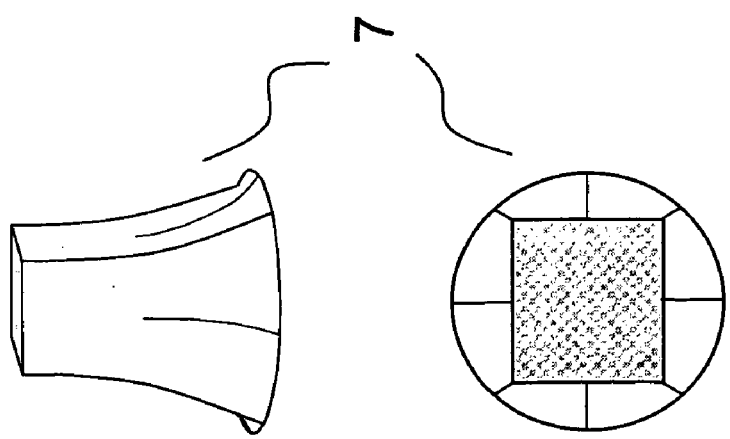

The base plan of the knobs 7 may advantageously be different from the circumference of the extrovert surfaces of the knobs 7. In a preferred embodiment the base plan of the knobs may also be essentially a circular or elliptic shape. It is also possible having an essentially regular polygonic shape of the base plan of the knobs 7. For example, the knobs 7 may have a base plan which is elliptic shape, e.g. circular, while the circumference of the extrovert surface has the shape of a regular polygon, e.g., a quadrangle, or the other way round. An example of such a combination is shown in FIG. 3a.

In principle, it is possible to think of many combinations of the base plan of the knobs and circumferences. It is preferred that the area of the base plan is larger than the area of the extrovert surfaces. The knobs 7 have in a preferred embodiment essentially the shape of contracted or cut cones, such as shown in FIG. 3b. Another alternative is that the knobs 7 may essentially have the shape of contracted or cut pyramids, such as shown in FIG. 3c.

Figure 4C:
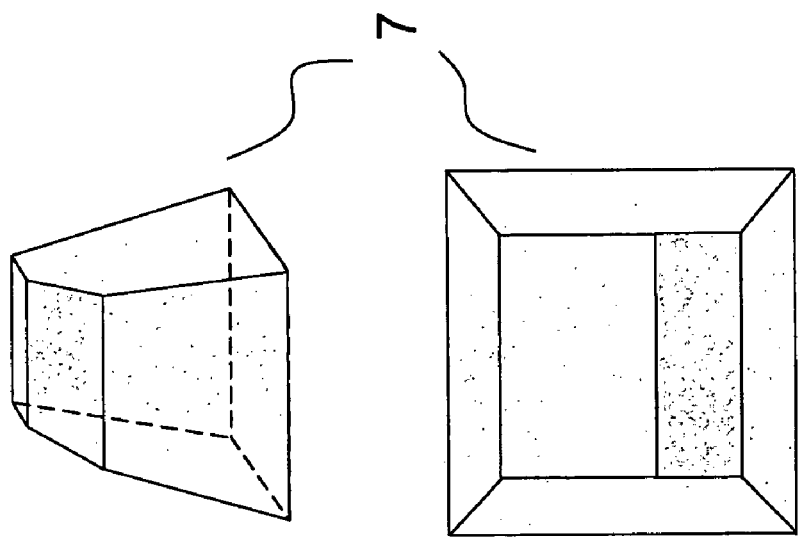
Figure 4B:
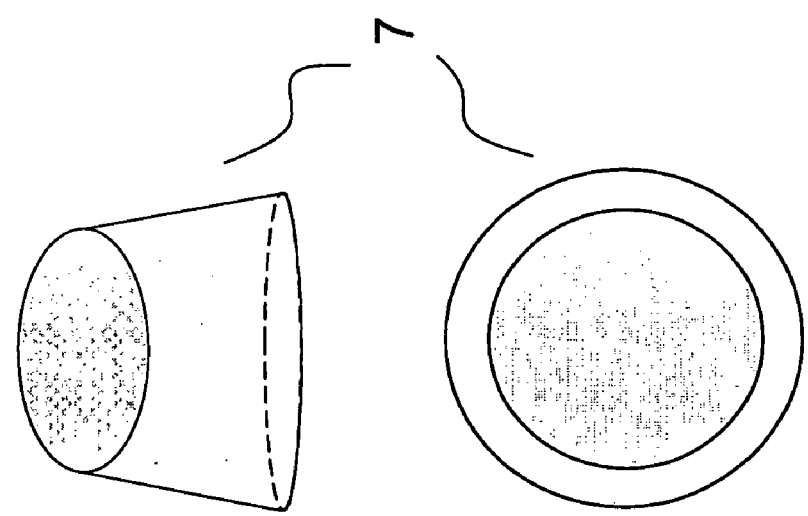
Figure 4A:
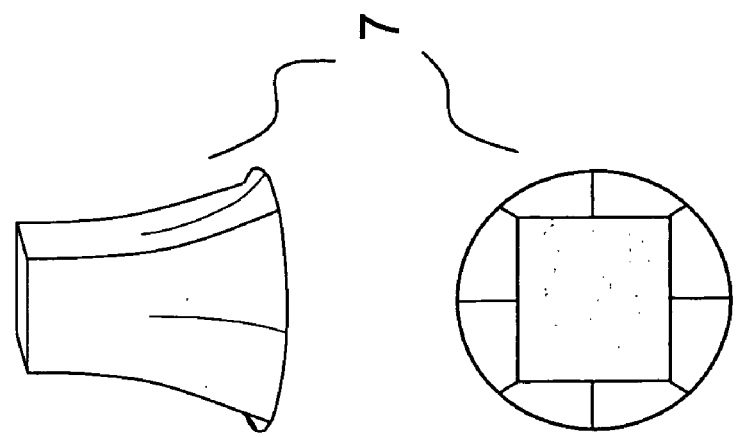
Figure 5:
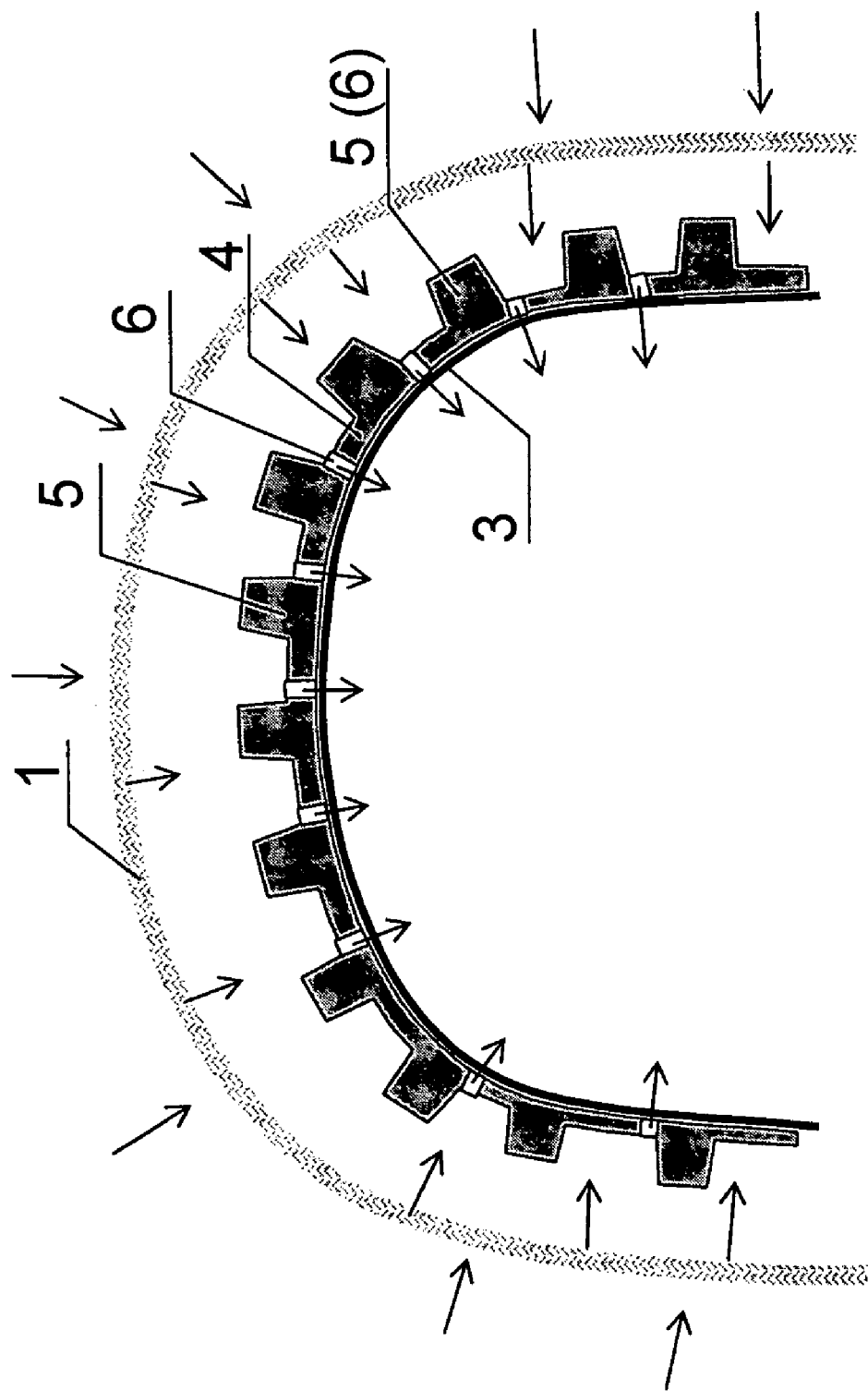
Figure 6:
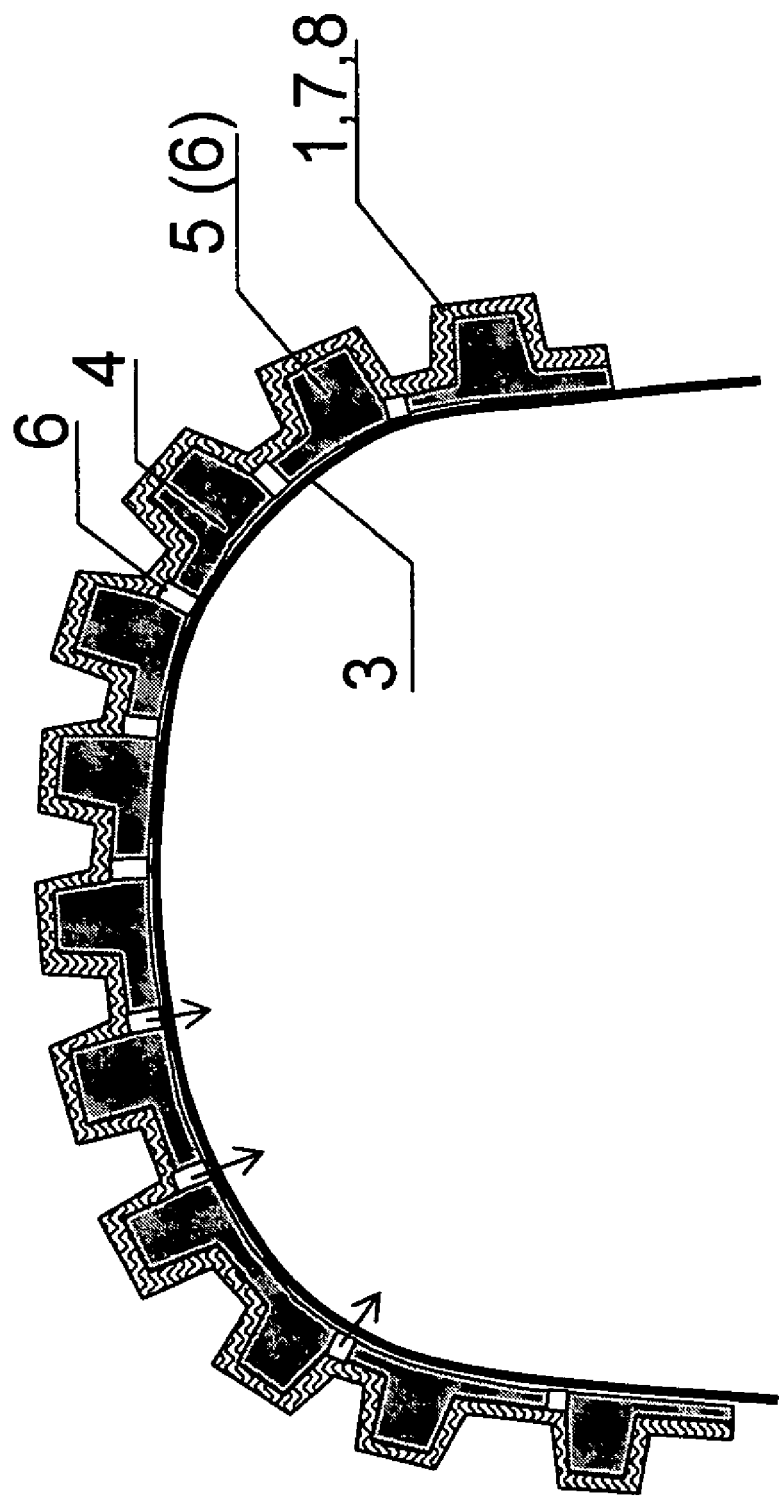
Figure 7:
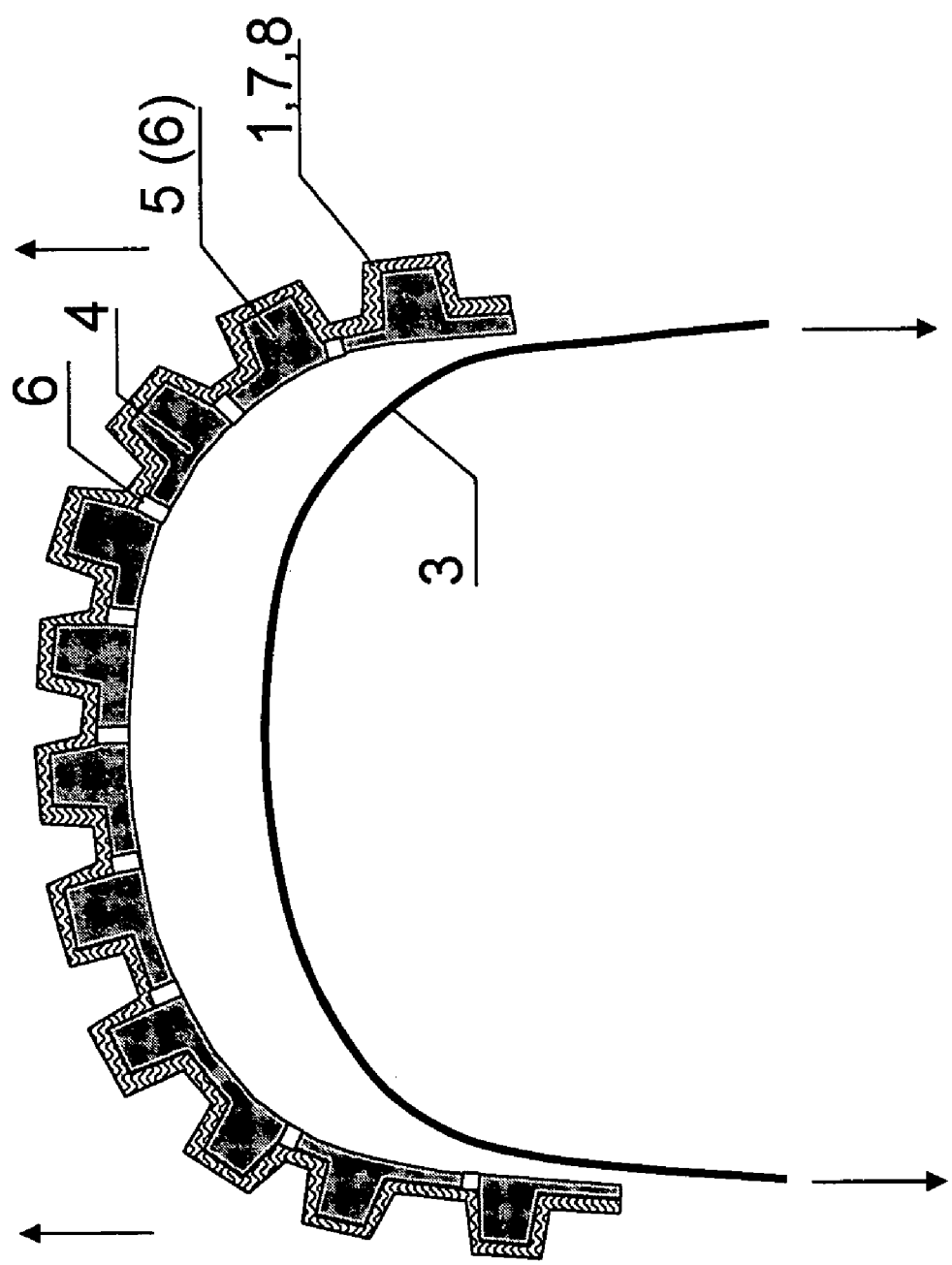
Figure 8:
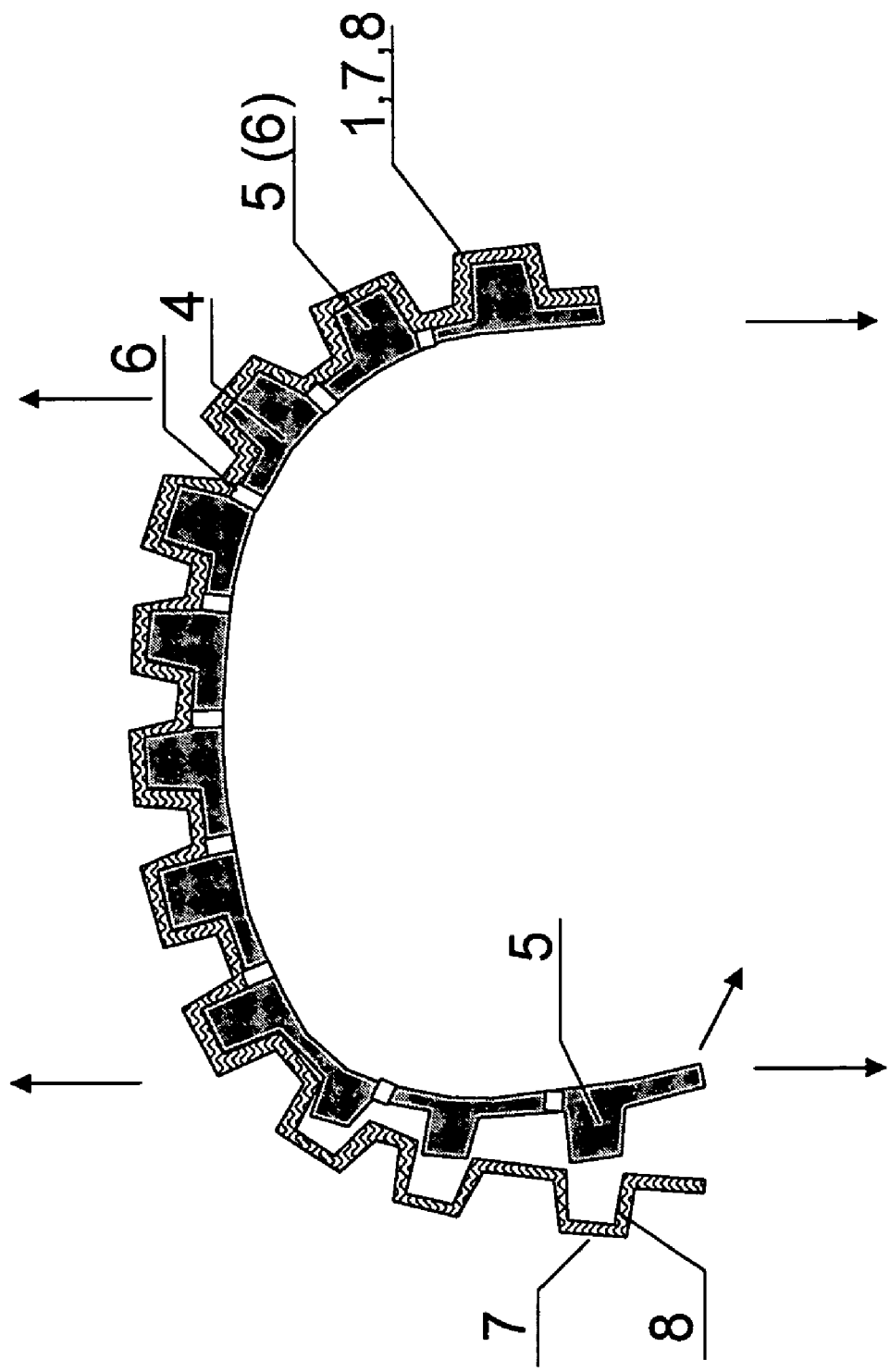

Reference is now made to FIG. 4a-4c, which illustrate that the extrovert surfaces of the knobs 7 may have different shapes. FIG. 4a shows a knob 7 having a straight cut shape, FIG. 4b shows a knob having a angular cut shape, and FIG. 4c shows a knob 7 which exhibits a combination of both straight and angular cut shape.

The material in the helmet liner 10 may, e.g., be plastic, metal, or a combination of plastic and metal. Examples of suitable materials is a thermoplastic, aluminum or steel, or a combination of thermoplastic and aluminum. By utilizing combination materials, the combination may, e.g., constitute a layer of thermoplastic and a layer of a metal foil, e.g., of aluminum, which are consolidated during manufacture of the helmet liner 10.

Figure 10:
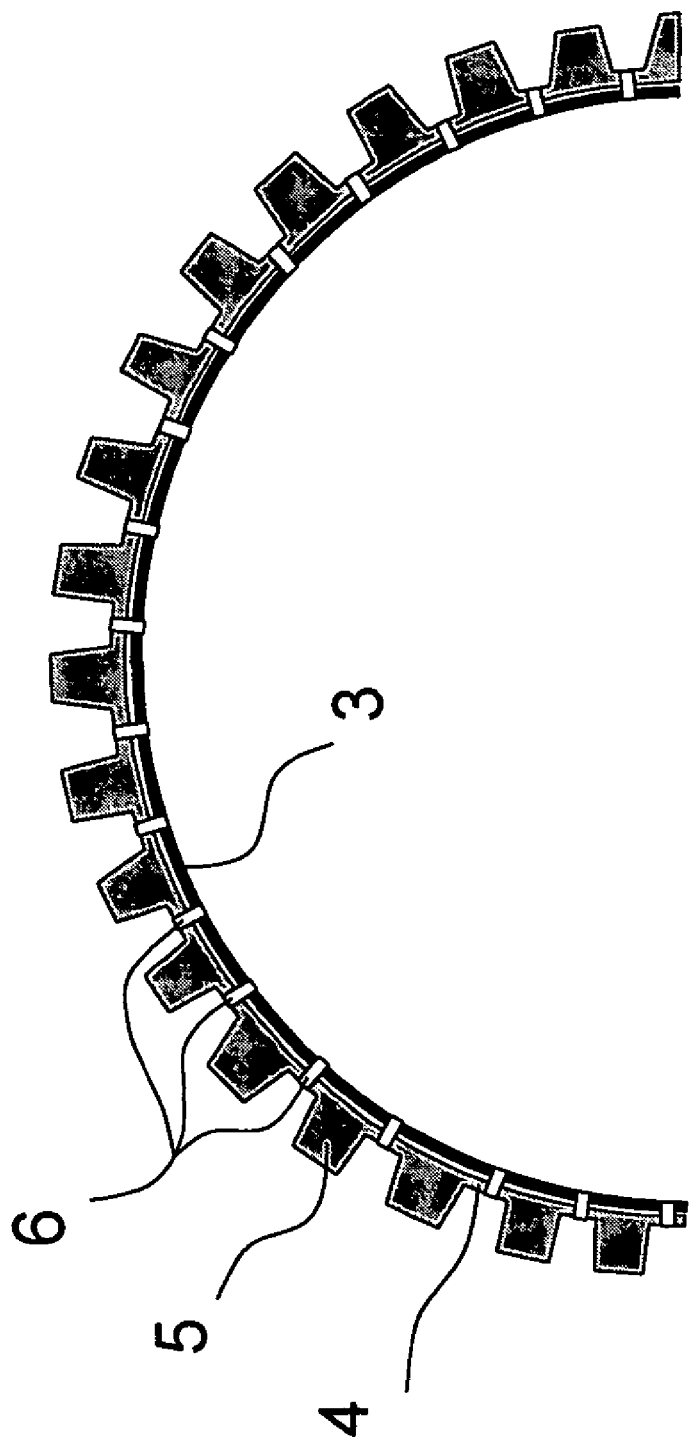
FIG. 10 is a schematic and simplified vertical section through a possible mould which may be utilized for manufacturing the helmet liner according to the invention.

In FIG. 10, a simplified and schematic view of a first mould 3,4,5 for manufacturing a helmet liner 10 with undercut is shown. The mould may stand on a base foundation like the mould 3,4,5 (not shown) on FIG. 10. The mould comprises a flexible slip mould 4 having secondary, relatively rigid and protruding shapes 5 on a main mould 3. In one embodiment, the main mould is itself rigid, e.g., in the form of a rigid shell or a massive mould. In an alternative embodiment of the invention, the main mould 3 is stretchable to a fixed shape and collapsible.

The mould 3,4,5 may be arranged for thermoforming, e.g., by vacuum moulding, and may be arranged for vacuum moulding by arranging vacuum ducts 6 at least through the slip mould 4. In another embodiment of the invention, vacuum ducts 6 are further arranged through the main mould 3. The mould 3,4,5 may alternatively be arranged for press forming.

Figure 11:
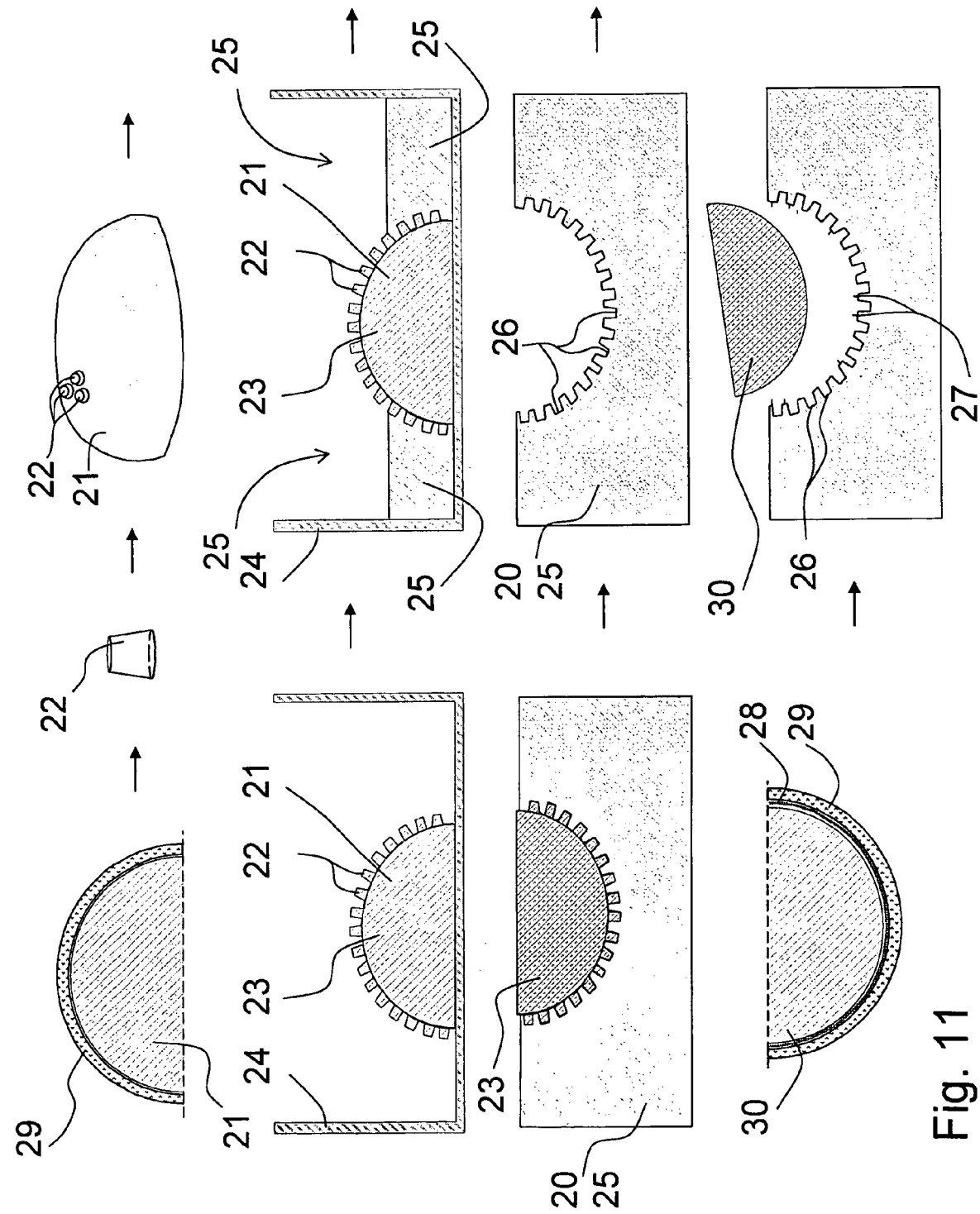
FIG. 11 is a schematic and simplified cartoon series with perspective view and vertical section which explains a method for manufacturing a second mould, which also is illustrated schematically at the bottom of and to the right on the figure, for a flexible slip mould according to the invention.
Figure 12:
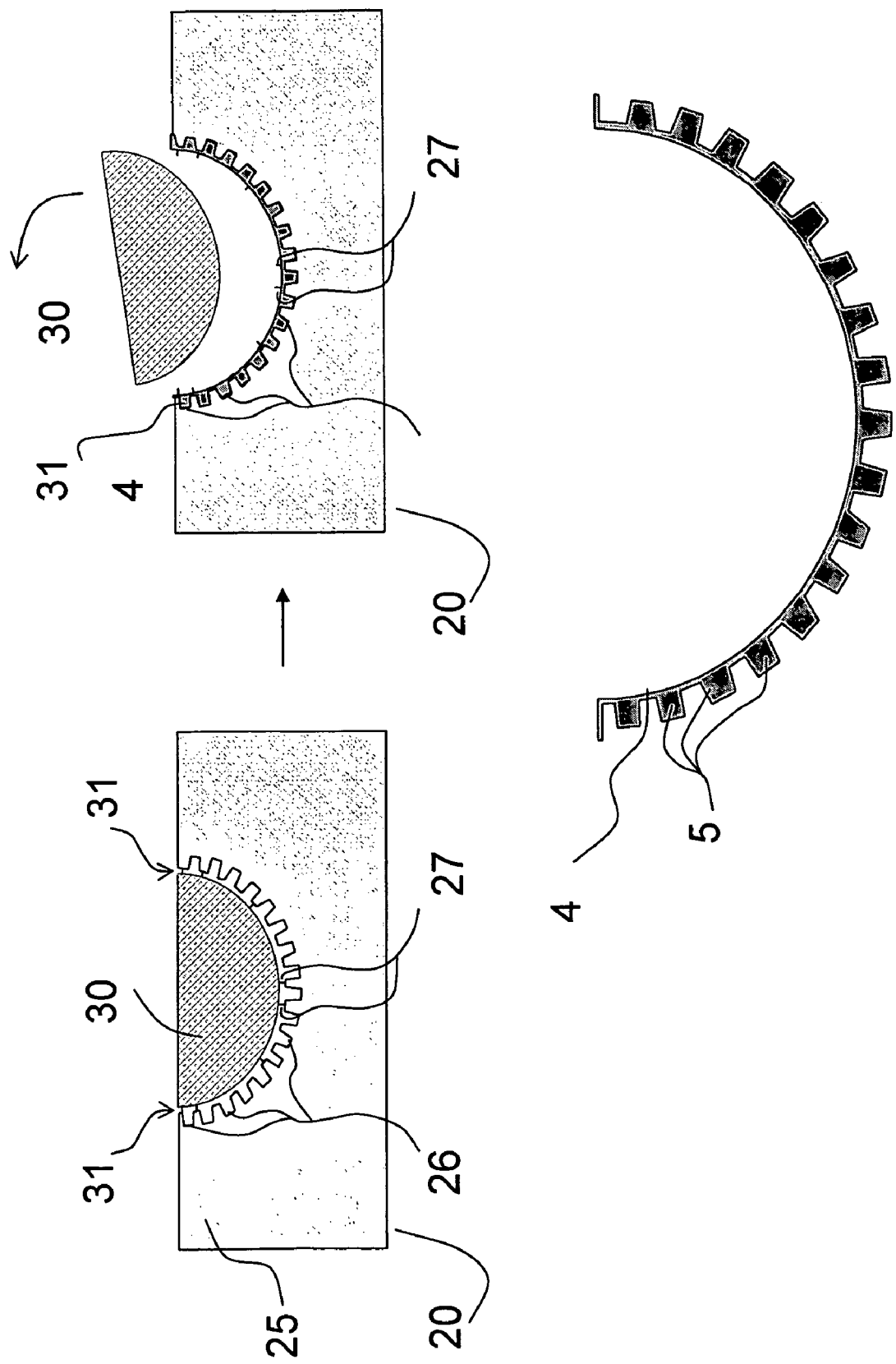
FIG. 12 is a further schematic and simplified cartoon strip with vertical section which explains a possible method for manufacturing a flexible slip mould according to the invention.
Figure 13:
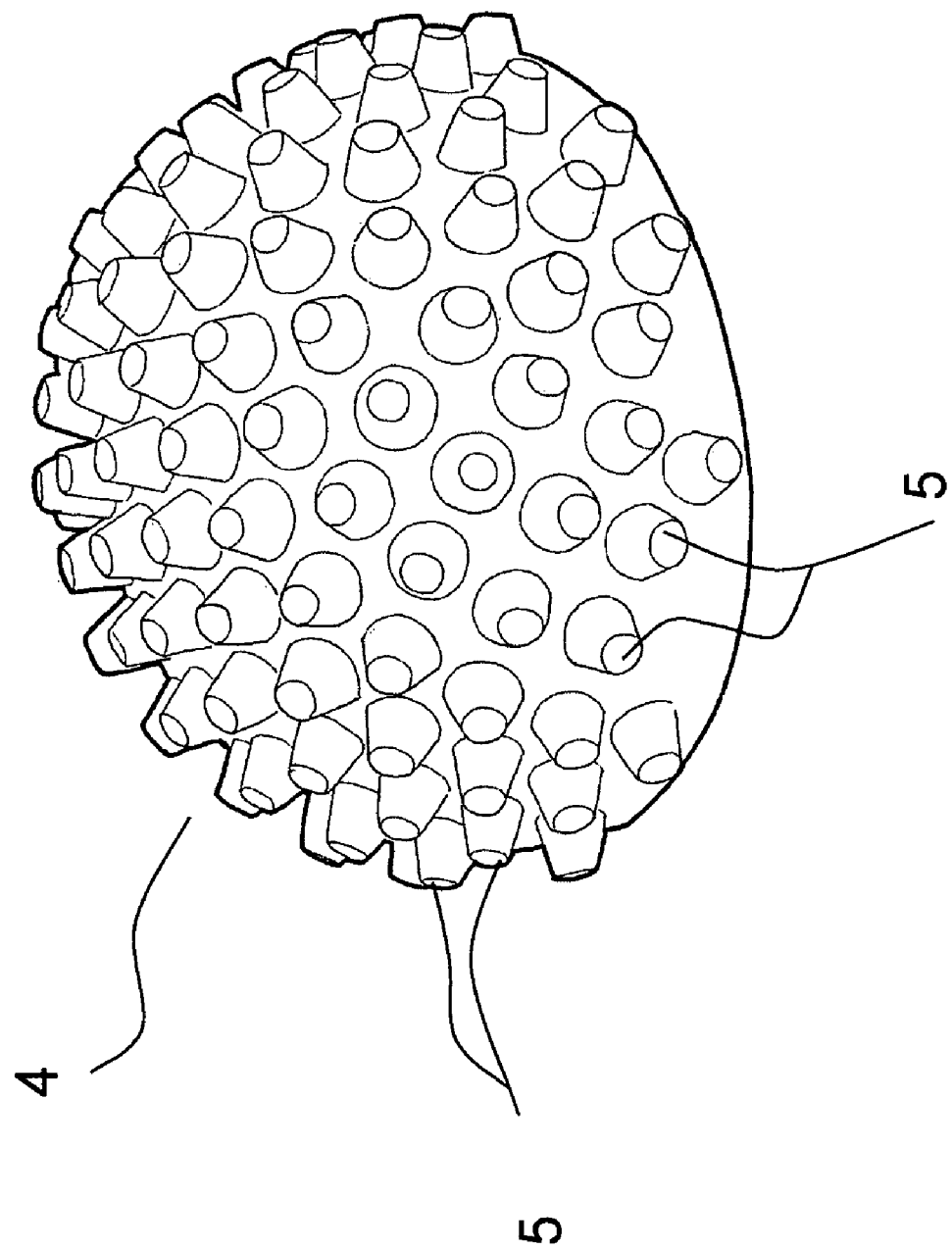
FIG. 13 shows a possible embodiment of the flexible slip mould according to the invention.

Reference is now made to FIG. 11, in which a simplified and schematic cartoon series for manufacturing a second mould for the flexible slip mould 4,5.

A method for manufacturing a second mould 20 for a flexible slip mould 4 with secondary, protruding shapes 5 has been provided, in which the flexible slip mould 4 shall be utilized for production of a helmet liner 10 with undercut. The method may, e.g., comprise the following steps:

Manufacturing a first initial mould 21 which essentially corresponds with the shape of the upper part 16 of the head of a person or of the inside 41 of a generally hemispherical dome 29, a helmet 29 or an object with a helmet shape 29.

Attaching knobs 22 in the desired number and distribution on the entire or parts of the first initial mould 21 so that a template 23 is formed for the second mould 20. The knobs 22 may be bought in ready for use, moulded or turned or provided in other ways.

Arranging the template 23 in a container 24.

Filling a curable mould material 25 over the template 23 in a container 24.

Consolidating the mould material 25 in the container 24 with the template 23, for formation of the second mould 20 with one or more recesses or cavities 27 which corresponds to the external surface of the knobs 22, and in which the second mould 20 with the recesses 26 is arranged for manufacture of the flexible slip mould 4 with secondary, protruding shapes 5.

Removing the second mould 20 from the container 24.

Removing the template 23 from the finished second mould 20. The template 23 with knobs 22 may itself exhibit undercut in relation to the mould 20. The template may for this reason be divided in a removable core (not shown) and a flexible external part with the knobs 22 so that the removable core is first removed and the flexible external part is thereafter drawn from the second mould.

Distance or centering pegs 27 may be attached in the second mould 20 in the desired amount and distribution.

The mould material 25 may be a liquid or dry, ductile material which hardens or sets, e.g. by means of itself in contact with air, and is preferably a thermosetting plastic such as epoxy, or a combination of a thermosetting plastic and a filler material, e.g. wood.

A temporary lining 28 may be applied inside the dome 29, helmet 29 or the object having a helmet shape 29, for adapting the size of the space between the second mould 20 with the recesses 26 and a second, complementary initial mould 30. The second, complementary initial mould 30 is manufactured by moulding inside the dome 29, the helmet 29 or the object with a helmet shape 29 with the temporary lining 28.

At the bottom and to the right on FIG. 11, a schematic view of a finished second mould 20 is shown. The second mould 20 for a flexible slip mould 4 with secondary, protruding shapes 5, for production of a helmet liner 10 with undercut, e.g. comprise the following features:

that the second mould 20 comprises one or more recesses or cavities 26 arranged for receiving moulding mass 31, and one or more centering pegs 28 distributed in the second mould 20 with the recesses 26 and arranged for centering a second, complementary initial mould 30 in the second mould 20 with the recesses 26;

that the second initial mould 30 has a diameter which is less than the diameter of the second mould 20 and which is designed for being arranged in the second mould 20 so that a spacing 31 is formed between the second mould 20 with the recesses 26 and the second initial mould 30 which is arranged for receiving moulding mass 31;

so that by consolidation of moulding mass 31 in the spacing 31, a flexible slip mould 4 with secondary, protruding forms 5 is formed, for arrangement on a fixed mould 3 with a shape complementary to the second initial mould 30.

The flexible slip mould 4 with secondary, protruding forms 5, for production of a helmet liner 10 with undercut, may be manufactured in the following manner:

Filling moulding mass 31 in a second mould 20 which comprises one or more recesses or cavities 26 and one or more centering pegs 28 which are distributed in the second mould 20 with the recesses 26 and arranged for centering a second, complementary initial mould 30 in the second mould 20 with the recesses 26;

Arranging a second initial mould 30 within the mould 20 with the moulding mass 31, so that a spacing 31 is formed in relation to the second mould 20.

Consolidating the moulding mass 31 to the flexible slip mould 4 with secondary, protruding forms 5.

Removing the second initial mould 30 form the consolidated slip mould 4 in the second mould 20 with the consolidated, flexible slip mould 4.

Drawing out the flexible slip mould 4 from the second mould 20.

With the helmet liner and the helmet according to the present invention, several advantages are obtained, as indicated below. With the present invention it is possible to reduce or eliminate the risk for damaging the helmet liner 10 when it is removed from the first mould 3,4,5 after moulding. A helmet with a helmet liner according to the invention is provided with hollow knobs 7 which are arranged for permanent deformation or crushing by external impacts, and it is further shock absorbing, so that the forces from an impact against such helmet with a helmet liner 10 according to the invention are reduced as much as possible. By means of the methods according to the invention for manufacturing such helmet liner 10, it is possible to manufacture a helmet liner 10 of satisfactory quality in one batch, in which a desired shape and orientation of impact-absorbing knobs 7 are not limited by the unablement of the helmet liner 10 with undercut in the knobs 7 to be lifted, tilted, or rotated out of a mould according to the background art. Thus, it is achieved that the impact-absorbing knobs may be formed with such orientation and distribution on the head form in such a way that the desired protection is obtained without regard to the limitations of the back-ground moulding techniques.

| List of components | |
|---|---|
| 1 | softenable and/or flexible tight film or foil |
| 2 | impact-absorbing, resilient layer |
| 3 | main mould |
| 4 | flexible slip mould |
| 5 | relatively rigid and protruding forms |
| 3, 4, 5 | a first mould for a helmet liner |
| 7 | knobs; protrusions |
| 8 | cavity |
| 1, 7, 8 | shaped starting product |
| 9 | external shell |
| 10 | helmet liner; the final shape of the helmet liner |
| 11 | internal liner |
| 12 | the brow of the person or user |
| 13 | the top of the head of the person or user |
| 14 | the back of the head of the person or user |
| 15 | the sides of the head of the person or user |
| 16 | the upper part of the head of a person or user |
| 17, 18, 19 | |
| 20 | a second mould for the flexible slip mould 4 |
| 21 | a first initial mould |
| 22 | knobs for template 23 |
| 23 | template for the second mould 20 |
| 24 | container for moulding of the second mould 20 |
| 25 | mould material for the second mould 20 |
| 26 | recesses or cavities in the second mould 20 |
| 27 | distance or centering pegs |
| 28 | temporary lining in a helmet or an object with a helmet shape 29 |
| 29 | helmet or object with helmet shape |
| 30 | a second, complementary initial mould |
| 31 | moulding mass |

The invention claimed is:

1. A method for manufacturing a rigid helmet liner comprising:

assembling a first mould comprising a flexible slip mould with secondary, relatively rigid and outward protruding forms arranged on an essentially rigid head-shaped main mould;

arranging a softenable and/or flexible, tight film or foil on said first mould;

forming said flexible, tight foil on said first mould to a helmet liner shaped product with a quantity of hollow protrusions and cavities, in which said helmet liner shaped product exhibits undercut relative to said first mould;

consolidating said helmet liner shaped product with a quantity of protrusions and cavities on said first mould to form a consolidated helmet liner shaped starting product;

removing said consolidated helmet liner shaped starting product and said flexible slip mould with said outward protruding forms from said rigid head-shaped main mould;

collapsing and removing said flexible slip mould with said outward protruding forms from said consolidated helmet liner shaped product.

2. The method according to claim 1, wherein the step of forming said flexible, tight foil to a helmet liner shaped product with said quantity of hollow protrusions and cavities, comprises vacuum moulding of said flexible, tight foil on said first mould through vacuum ducts arranged through said flexible slip mould.

3. The method according to claim 1, wherein the step of forming said flexible, tight foil to said helmet liner shaped product with said quantity of hollow protrusions and cavities, comprises press moulding of said flexible, tight foil on said first mould.

4. The method according to claim 1, further comprising the step of manufacturing the final shape of the helmet liner from said rigid helmet liner shaped product.

5. The method according to claim 1, further comprising the step of softening said flexible, tight foil before the step of forming said flexible, tight foil.

6. The method according to claim 5, wherein the step of softening said flexible, tight foil takes place by heating.

7. The method according to claim 1, further comprising the step of consolidating said helmet liner shaped product on said first mould by cooling and setting after the step of forming said flexible tight foil.

8. The method according to claim 7, wherein the step of consolidating the helmet liner shaped product takes place by hardening.

9. The method according to claim 1, further comprising the step of maintaining the rigid main mould in a stretched and rigid state by said rigid main mould itself being rigid, in the form of a rigid shell or massive shape.

10. The method according to claim 1, further comprising the step of maintaining said rigid main mould in a stretched and rigid state by supplying fluid pressure internally in said rigid main mould.

11. The method according to claim 1, further comprising the step of simultaneously removing said rigid main mould and said flexible mould with said secondary protrusions from said helmet liner shaped product.

12. The method according to claim 1, further comprising the step of stretching said flexible, tight foil over said first mould by supply of fluid before the step of forming the flexible tight foil.

13. The method of claim 12, wherein said supply of fluid comprises a gas.

14. The method of claim 13, wherein said gas is air.

* * * * *